Patented Oct. 18, 1927.

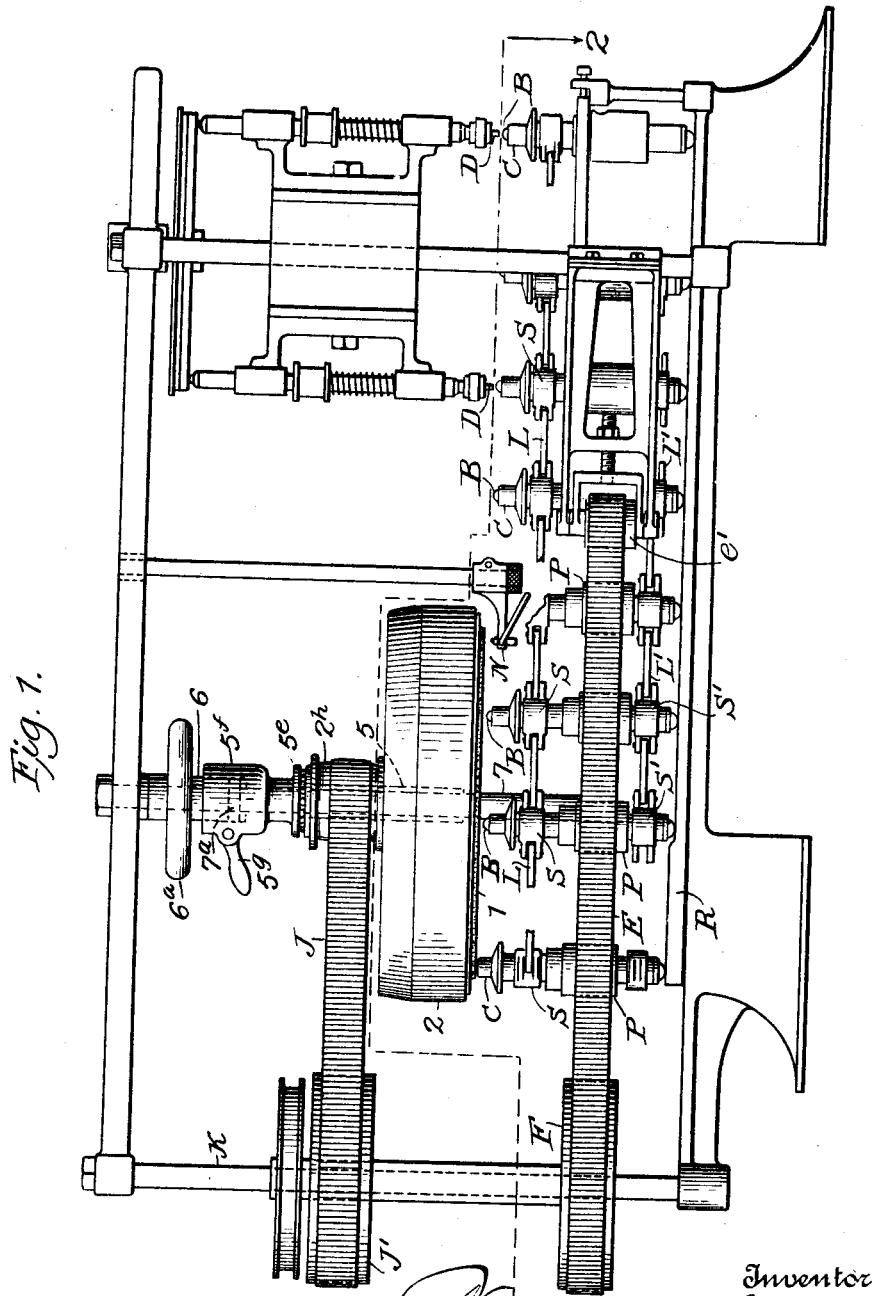

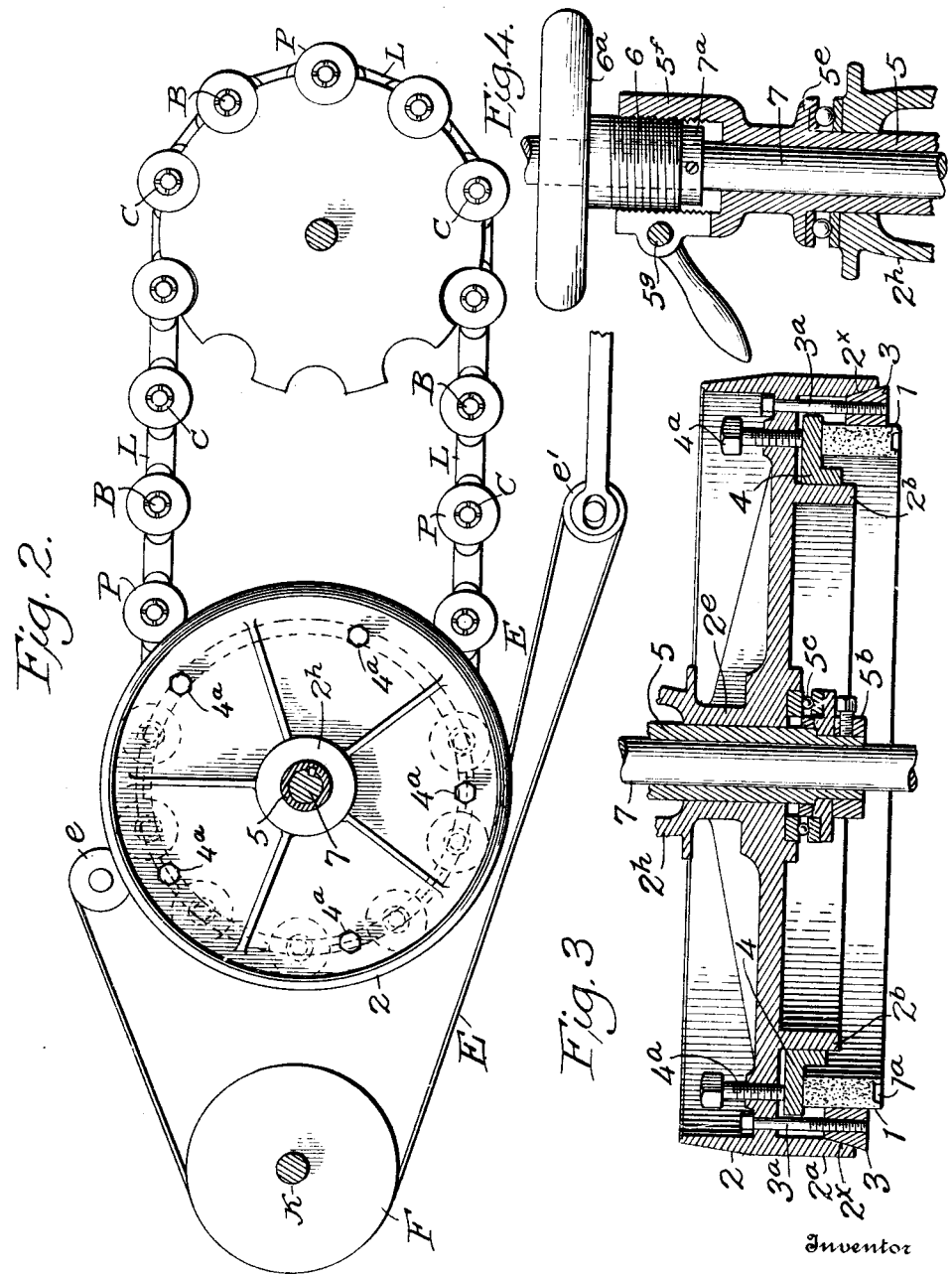

1,646,132

UNITED STATES PATENT OFFICE.

NICHOLAS BARRY, OF MUSCATINE, IOWA.

BUTTON-BLANK-FACING MACHINE.

Application filed January 19, 1923. Serial No. 613,653.

This invention is a novel improvement in machines for grinding or facing button blanks, and is especially intended for use in the manufacture of "pearl" buttons. It is also an improvement on the button machines shown in Patent #766,014 dated July 26, 1904, in which are employed a series of blank holding chucks moving in an endless orbital path, and each adapted to receive a button blank at one point and then present such blank to the facing devices, and thereafter the drilling devices, so that the blank, when discharged from the machine, is properly faced and perforated.

In the present invention, instead of the facing devices traveling with the chucks as in my aforesaid patent, I employ a grinding annulus or disk which is located concentrically with the path of travel of the series of chucks at one portion of their orbit, and provided in its under side or face opposed to the chucks with an annular groove, which is of a contour in cross section conformable to a diametrical section through the face of the button; and this grinder is preferably rotated while the chucks are traveling, and means are provided whereby as each chuck reaches a proper position beneath or opposite the grinder the chuck will be moved so as to enter the face of the blank into the groove in the grinder. The chuck is also preferably caused to rotate at the time it presents the blank to the grinder and while it holds the blank in contact with the walls of the groove in the grinder, this resulting in quickly and simultaneously presenting and grinding diametrically opposite portions of the face of the blank to opposite walls of the groove in the grinder; and the grinding or facing of the blank is simultaneously effected by the contact of opposite portions of its face with the opposite walls of the groove in the grinder, and by the rotation of the grinder, and the rotation of the chuck; and preferably by the simultaneous rotation of both the chuck and the grinder.

Heretofore button blank facing machines have been made with a grinder located eccentrically with respect to the path of travel of the chucks or blanks so that as the chucks travel past the grinder one side portion of the face of the blank is brought into contact with the grinder and the blank is ground to the proper "face." A great deal of trouble has been experienced with these machines, and many imperfect buttons produced thereby by reason of the fact that when the chucks bring the blank into contact with the edge of the grinder the impact of the wheel on the blank tends to knock the blank out of the chuck, or tilt the blank in the chuck, and the blank is permanently knocked out or ground lop-sidedly, one side being thicker than the other because it was tilted in the chuck. The operator cannot tell whether the blanks have been evenly supported in the chuck until the buttons are discharged therefrom. Such lop-sided buttons are either unsalable or are greatly impaired in value, or have to be reground to an even thickness, which entails new expense of production, while the reground blanks are not as valuable, because of their reduced thickness, as those blanks finished in the first instance. If the blank is thin it also frequently happens with such eccentrically arranged grinders that the center of the blank is left unfinished, or is left with a flat spot, particularly if great care is not taken in dressing the grinding wheel.

The object of my invention is to obviate danger of the blanks being knocked out of the chucks, and to prevent tilting of the blanks in the chucks during the facing operations; and to cause the grinder to assist in holding the blanks in the chucks, and truly and accurately face the blanks.

A further object of the invention is to reduce the time required to grind the blanks, this being accomplished by having the grinder arranged concentric to the path of travel of the chucks beneath such grinder; and having such grinder provided with a groove in its under face into which the blanks are entered by the chucks; and when the blanks are raised into the grooves opposite portions of the face of the blank simultaneously contact with the opposite side walls of the groove, and thus practically both sides of the face of the blank are simultaneously operated upon, and there is no tendency of the blank to tilt out of the chuck, or to be knocked out of the chuck by the action of the grinder, or to be tilted in the chuck by any relative eccentric movement of the chuck and the grinder, while the blank is being held in contact with the grinder, during the grinding operation, or during the time the ground blank is being moved out of contact with the grinder.

The invention is simple but efficient, and in order to enable others to adapt and use the invention I will explain the embodiment thereof illustrated in the accompanying drawings, and summarize in the claims the essentials of the invention and novel details of construction of parts for which protection is desired.

In said drawings:

Fig. 1 is a side elevation of a part of the button blank facing and drilling machine, partly in section.

Fig. 2 is a section on the line 2—2, Fig. 1.

Fig. 3 is an enlarged detail sectional view of the grinder.

Fig. 4 is an enlarged detail view of the means for vertically adjusting the grinder.

The machine as shown, has a rotatable set of drilling tools D at one end; and a grinder 1 at the other end. The grinder and the set of drilling tools are rotatable in a horizontal plane. The machine also has an endless series of chucks C each adapted to hold a button blank B. Each chuck C is slidably and rotatably mounted in sleeves S, S', connected by links L, L', respectively, together forming an endless carrier by which the chucks are moved in an endless orbital path to and beneath the series of drills D, and then to and beneath the rotatable grinder 1. Suitable means are provided for supporting and rotating the series of drills D and moving them in an orbital path; and for rotating grinder 1 as hereinafter explained; and for guiding and moving the series of chucks in an orbital path; so that at the end of the machine adjacent the drills the chucks will travel coincident with the travel of the drills for part of their orbital movement; and at the end of the machine adjacent the grinder the chucks will travel coincident with the groove 1ª in the under surface of the grinder 1 for about 180 degrees. The chucks C are caused to successively present the blanks B to the grinder 1, and then to the drills D. As the chucks travel beneath the grinder they are caused to rotate on their own axes, by means of an endless belt E running around a drive pulley F on a shaft K, and around smaller pulleys e, e', disposed beneath and on opposite sides of the grinder 1, and contacting with pulleys P attached as shown to the chucks C intermediate the sleeves S, S'; so that as each chuck passes the roller e (see Fig. 2) its pulley P will engage belt E and cause the chuck to rotate on its own axis as said chuck travels between the pulleys e and e', during which travel the blank B in the chuck is subjected to the action of the grinder 1.

The machine thus far described (with the exception of the grinder 1) is substantially similar to that shown in my aforesaid Patent #766,014, and is well known to those familiar with the art, and therefore needs no further detailed explanation or description herein.

The present invention as applied to that machine includes a grinder 1 which is provided on its under side or surface parallel with the plane of the series of chucks, with an annular groove 1ª, (as shown in Fig. 3) which groove 1ª corresponds in cross section to a diametrical cross section of the face of the button.

The grinder is necessarily made of a very hard material, such as carborundum. It may be made in disk form, but I preferably make it in the form of an annulus, as shown, as by making it annular saves expense. The grinder 1 is carried by a wheel-like support or casting 2 which has a depending flange 2ª on its under side surrounding the grinder. Said flange 2ª is preferably slightly tapered outwardly and downwardly as at 2ˣ on its inner face, and a tapered complementary split clamping ring 3 is inserted between this flange 2ª and the outer face of the grinder 1, and this clamping ring 3 can be drawn upwardly by means of bolts 3ª (as indicated in the drawings), thereby wedging the clamping ring between the flange 2ª and the grinder, and tightly binding the latter in position.

Interposed between the top of the grinder and the web of the casting 2 is an adjusting ring 4 which is slidably fitted on the exterior face of an annular depending flange 2ᵇ on the casting 2, the flange 2ᵇ being concentric with the flange 2ª and spaced therefrom sufficiently to admit the grinder 1 and the adjusting ring 4 between the flanges 2ª and 2ᵇ. The ring 4 may be adjusted vertically by means of bolts 4ª tapped through the web of the support 2 as shown, and a sufficient number of bolts 4ª are used to enable the ring and grinder to be adjusted as a whole or in part at any desired point, so as to keep the groove 1ª in the grinder properly located relative to the path of travel of the blanks in the chucks passing thereunder.

The casting 2 is preferably rotatably mounted on a sleeve 5, which is slidably mounted on and keyed to a vertically disposed shaft 7. Said sleeve 5 has a collar 5ᵇ (as shown in Fig. 3) on its lower end, and a set of ball bearings 5ᶜ surrounds the sleeve and is interposed between the collar 5ᵇ and the casting 2 carrying the grinder. The casting has a hub 2ᵉ projecting above the upper surface of the web, and a pulley $2^h$ is formed on or rigidly attached to hub $2^e$ and a ball thrust bearing or flange $5^e$ (see Fig. 4) is interposed between the upper end of pulley $2^h$ and a collar $5^{\text{E}}$ on the upper end of sleeve 5 which extends through the pulley. Above collar $5^e$ the sleeve has a large internally threaded cup portion $5^f$ which is engaged by an externally threaded sleeve 6 rotatably mounted on shaft 7 and supported on a collar $7^a$ on said shaft within the cup. The cup $5^f$ is preferably split and provided with a clamping screw $5^g$ by which the cup can be clamped to the sleeve 6. The sleeve 6 can be turned on the shaft 7, as by a hand wheel $6^a$ when clamp $5^g$ is loosened. By turning hand wheel $6^a$ the sleeve 5 and grinder casting 2 and the parts supported by the casting 2 on sleeve 5, can be vertically adjusted so that the grinder groove $1^a$ can be positioned to operate properly upon the blanks B, brought into engagement with the groove by the chucks C.

The pulley $2^h$ may be driven by a belt J from a pulley J' mounted on the vertical shaft K, which shaft also carries the pulley F and said shaft may be driven as described in my aforesaid Patent #766,014.

The grinder 1 should be properly positioned so that the groove will properly operate on the blanks B when the latter are brought into contact with the walls of the groove. The groove $1^a$ should be formed in cross section to correspond with the diametrical cross section of the face of the button. The grinder 1 can be readily adjusted up or down to properly operate on the blanks in the chucks by turning the hand wheel $6^a$ and when properly adjusted can be fastened in such position by means of clamp $5^g$ which holds sleeve 5 in position, while the grinder support 2 is free to rotate on the sleeve. The grinder groove can be dressed, as desired, by means of a diamond point wheel dresser N which may be conveniently mounted on the machine, as indicated in Fig. 1, and can be used as desired. As the grinder wears down it can be lowered, to compensate for wear, by loosening clamp $5^g$ and slightly turning hand wheel $6^a$, to lower the grinder and its support toward the chucks.

As described in my said patent, when the machine is in operation the series of chucks C are moved in an endless orbit or path which at one point corresponds for about 180° with the orbital movement of the drill spindles D, and at another point corresponds for about 180° with the groove $1^a$ in the grinder 1. The blanks B are placed by hand in the chucks C, as the latter travel between the drilling and the grinding ends of the machine; and as the chucks come in line with the shaft 7 and start to travel around said shaft, in an arc coincident with the groove $1^a$, the chucks are caused to slightly rise, preferably by means of suitable cams indicated at R in the drawings (substantially as in my aforesaid patent) and as the chucks rise, the blanks held therein are entered into the groove $1^a$ with the center of the blanks coincident with the center of the groove. Consequently diametrically opposite parts of the face of the blank are simultaneously ground by contact with the opposite side walls of the groove $1^a$ of the grinder 1, which grinder is rapidly rotated.

Just before the blanks B are brought into contact with the groove $1^a$, as described, the chucks are caused to rapidly rotate by the engagement of the chuck pulleys P with the belt E, so that during the grinding operation the face of each blank is ground by contact with the walls of the rapidly rotating grinder and continuous rotation of the blank on its own axis by the action of the belt E.

During the grinding operation the chucks travel concentrically with the axis of the grinder, and when the chuck is raised to bring a blank into contact with the grinder it moves concentrically with the groove $1^a$, and both sides of the face of the blank simultaneously contact with opposite sides of walls of the groove $1^a$ and there is no tendency whatever to tilt the blank in the chuck or knock the blank out of the chuck; as happens so frequently in machines wherein the grinder operates on one side of the face of the blank, or eccentric to the face of the blank.

By use of my invention there is very much less breakage of the blanks, the production of lop-sided blanks is avoided; the grinder is easily adjusted to compensate for wear, and the grinding groove can be easily dressed; also less power is required to operate the machine because of the concentric relation of the parts; the grinder wears more evenly because of this concentric relation; and after the grinder is once properly adjusted to operate there is practically no further adjustment required of the grinder in the support.

What I claim is:

1. In a machine of the character specified, a shaft, a sleeve slidably mounted thereon, a grinder support rotatably mounted on said sleeve, an annular grinder on said support; the said sleeve carrying the grinder having an internally threaded split cup on its upper end; a threaded sleeve engaging said cup, and means supporting the threaded sleeve on the shaft; said threaded sleeve adjustably supporting the first sleeve whereon the grinder is mounted.

2. In a machine of the character specified, the combination of a supporting shaft, a sleeve slidably mounted upon said shaft having an internally threaded upper end; a second sleeve rotatably mounted upon the shaft above the first sleeve, means for supporting the second sleeve on the shaft above the first sleeve, said second sleeve having an externally threaded lower end engaged with the internally threaded upper end of the first sleeve whereby rotative adjustment of the second sleeve causes longitudinal adjustment of the first sleeve on the shaft; a grinder support rotatably mounted upon the first sleeve and adjustable therewith longitudinally of the main shaft, and a grinder carried by said support.

In testimony that I claim the foregoing as my own, I affix my signature.

NICHOLAS BARRY.